No. 881,587. PATENTED MAR. 10, 1908.
H. G. HUSTED.
TROLLEY WHEEL PLACING DEVICE.
APPLICATION FILED JULY 29, 1907.
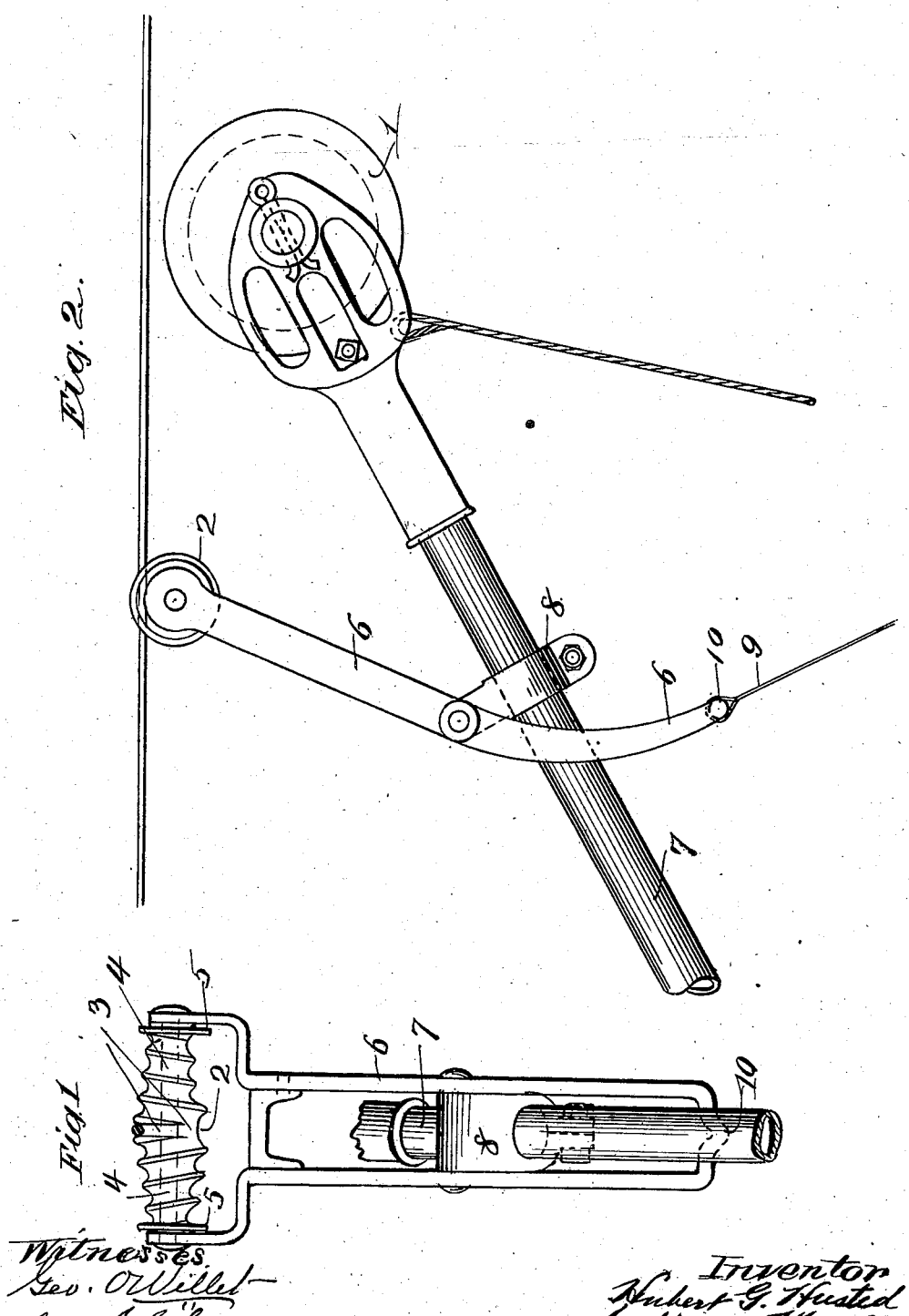

UNITED STATES PATENT OFFICE.

HUBERT G. HUSTED, OF OBERLIN, OHIO.

TROLLEY-WHEEL-PLACING DEVICE.

No. 881,587.　　　　Specification of Letters Patent.　　Patented March 10, 1908.

Application filed July 29, 1907. Serial No. 385,993.

*To all whom it may concern:*

Be it known that I, HUBERT G. HUSTED, a citizen of the United States, and resident of Oberlin, county of Lorain, State of Ohio, have invented certain new and useful Improvements in Trolley-Wheel-Placing Devices, of which I hereby declare the following to be a full, clear, and exact description, such as will enable others skilled in the art to which it appertains to make and use the same.

The objects of the invention are to provide an auxiliary device for automatically placing a trolley upon the trolley wire of an electric car, and to lessen the difficulty of finding the wire and of placing the trolley wheel thereon, which when traversing switches or curved portions of track is a matter for careful adjustment of the trolley pole and often consumes much valuable time. At night, it also is exceedingly difficult to see the wire and to place the trolley wheel thereon, and to overcome largely the difficulty this improved form of rotating guide has been designed by means of which it is not necessary to place the trolley wheel directly upon the wire, but if any portion of the guide strikes the wire, the trolley wheel will immediately be brought into line with the wire and placed upon it.

The invention comprises the elongated guide or idler provided with a central groove into which the wire will run if any part of the idler should be brought into engagement with the wire.

The idler is also provided with reversely arranged spiral grooves one on each side of the central groove which serve to draw the wire to the central groove, when the wire is engaged on either side of the center.

The invention therefore comprises the automatically wire centering and trolley wheel placing idler in connection with a pivotal support-therefor mounted upon the trolley pole, and further consists in the combination and arrangement of parts and construction of details hereinafter described shown in the accompanying drawings and specifically pointed out in the claims.

In the accompanying drawings Figure 1 is an edge view of the trolley wheel placing idler showing the manner of mounting the same upon the trolley pole; Fig. 2 is a side elevation of a trolley wheel and pole showing the automatic trolley wheel placing device in the act of centering the wire relatively to the trolley wheel.

In these views 1 is the trolley wheel, 2 is the auxiliary wheel placer or grooved idler. This idler is provided with an annular central groove 3 upon each of the wheel extend the rotating spiral grooves 4, which communicate with the central groove 3, and terminate against the outer flanges 5 at the extremities of the idler.

The idler is provided with supporting rock-arms 6 pivotally secured upon the trolley pole 7 by means of suitable attachment such as clamp 8.

The rock-arm extends below the trolley pole and a cord 9 attached to the lower end serves to elevate the idler so as to engage it with the wire.

The loop 10 at the lower end of the rock-arm strikes against the pole when the idler falls and prevents the idler from striking against the pole.

The advantages of the invention are obvious, since although the lateral range is more or less limited, it enables the conductor to approximate the proper location for the wheel on the wire, and the auxiliary device will bring the trolley wheel right to the wire, which is a matter of very great advantage especially at night.

Having described the invention what I claim as new and desire to secure by Letters Patent is, 1. In an automatic trolley wheel placing device, in combination with the trolley wheel and the pole therefor, a swinging arm pivoted upon the pole below the wheel, and adapted to normally fold thereon, an idler pivoted in said arm and provided with a central annular groove, and reversely spiral grooves at each end communicating with said central groove and with an annular flange at each extremity, said idler adapted to be raised to a greater elevation than said wheel when the pole is inclined, and means for raising said arm and idler from the folded position, and for releasing the same.

2. In an automatic trolley wheel placing device secured to the pole the combination with the pole and wheel of an idler provided with reversely arranged spiral grooves extending from each end towards the center a central annular groove in the idler with which said spiral grooves communicate, an arm pivotally secured upon the pole upon which arm the said idler is pivotally mounted, said arm having an extension projecting below said pole, and a manipulating cord attached to the lower extremity of said arm.

3. In combination with a trolley pole and wheel adapted to run upon a trolley wire, an auxiliary device for placing the trolley wheel, and for drawing it into alinement with the wire, and comprising a pivoted idler, said idler provided with a central annular groove, auxiliary reverse spiral grooves on each side thereof and terminal flanges and a pivoted support for said idler upon said pole.

In testimony whereof I hereunto set my hand this 24 day of July 1907.

HUBERT G. HUSTED.

In the presence of—
WM. M. MANOR,
GEO. S. COLE.